Oct. 3, 1933.    O. R. HELLER    1,928,977
STEERING APPARATUS
Filed Jan. 7, 1933    3 Sheets-Sheet 1
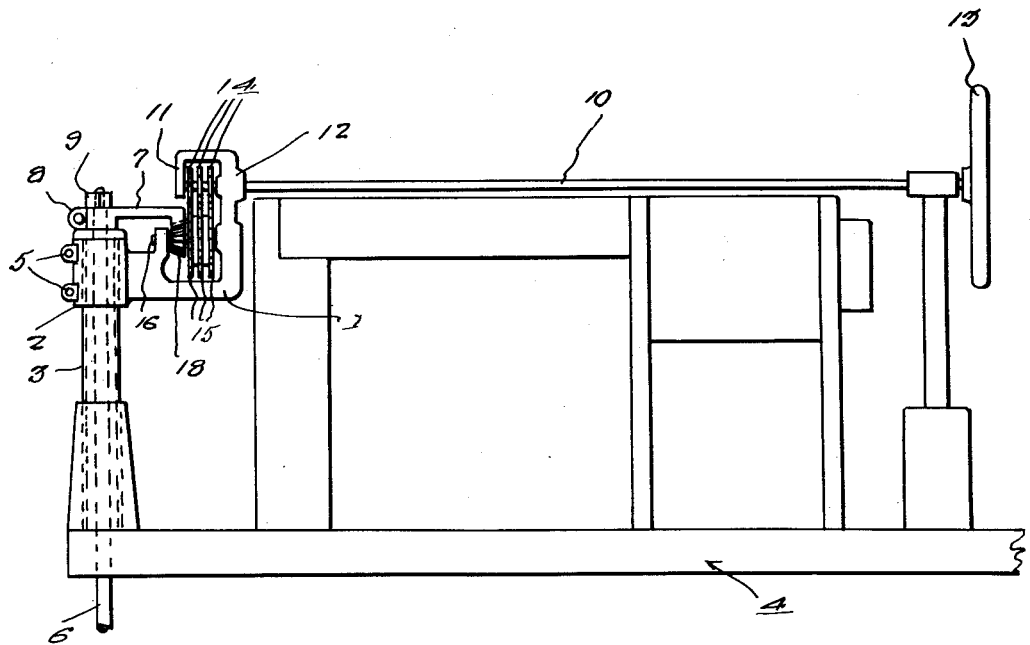
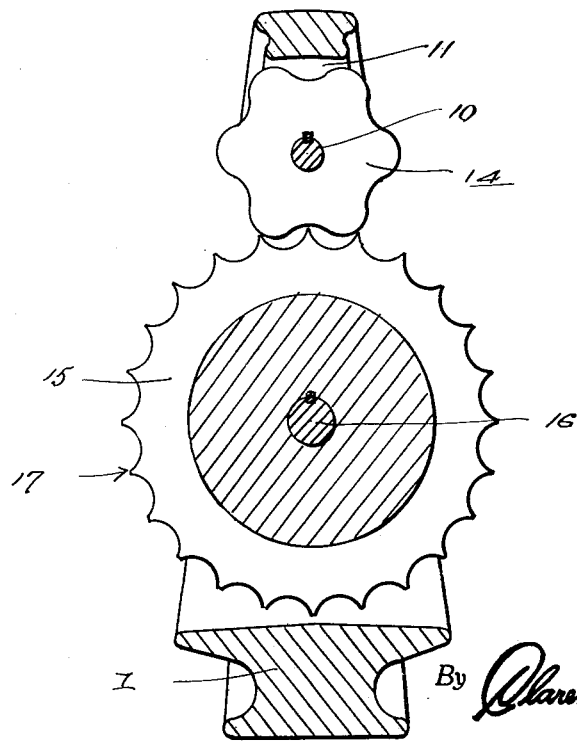
Inventor
O. R. Heller
By Clarence A. O'Brien
Attorney Oct. 3, 1933.   O. R. HELLER   1,928,977
STEERING APPARATUS
Filed Jan. 7, 1933   3 Sheets-Sheet 2

Inventor
O. R. Heller
By Clarence A. O'Brien
Attorney

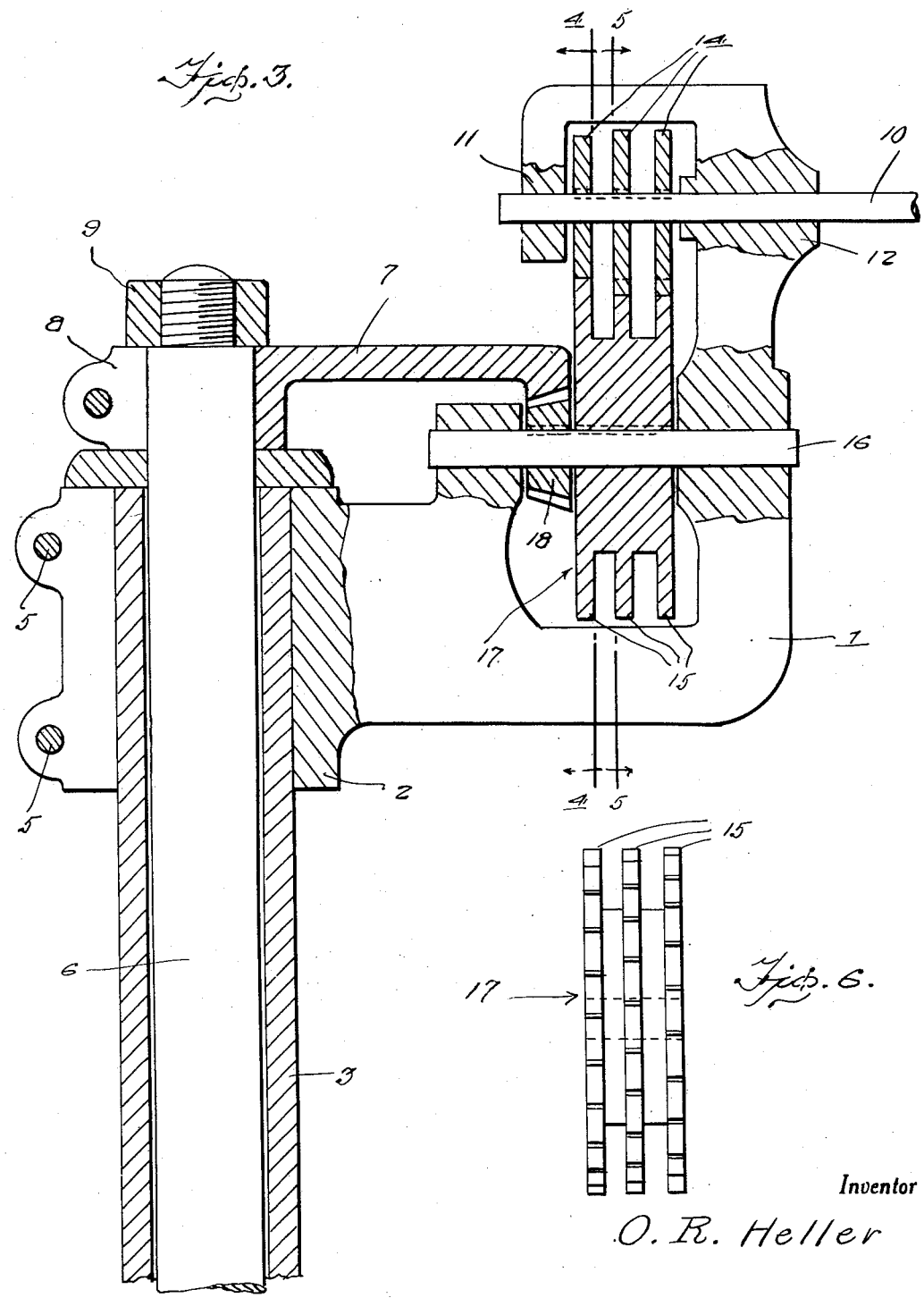

Patented Oct. 3, 1933

1,928,977

UNITED STATES PATENT OFFICE 1,928,977

STEERING APPARATUS

Orrin Russel Heller, Silver Lake, Kans.

Application January 7, 1933. Serial No. 650,723

3 Claims. (Cl. 280—87)

The present invention relates to a steering apparatus for vehicles, particularly automobiles and tractors, and has for its primary object to provide, in a manner as hereinafter set forth, an apparatus of this character which will be irreversible or, in other words, which embodies a novel construction, combination and arrangement of parts through the medium of which power may be readily transmitted from the steering wheel to the front wheels of the vehicle but in which the transmission of power in the opposite direction will be positively prevented.

Other objects of the invention are to provide a steering apparatus of the aforementioned character which will be simple in construction, strong, durable, efficient and reliable in operation, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation, showing a steering apparatus in accordance with the present invention interposed in the steering mechanism of a conventional type of tractor.

Figure 3 is a view principally in vertical section through the device.

Figure 4 is a view in vertical transverse section, taken substantially on the line 4—4 of Figure 3.

Figure 6 is a detail view in plan of the compound driven gear.

Figure 2:
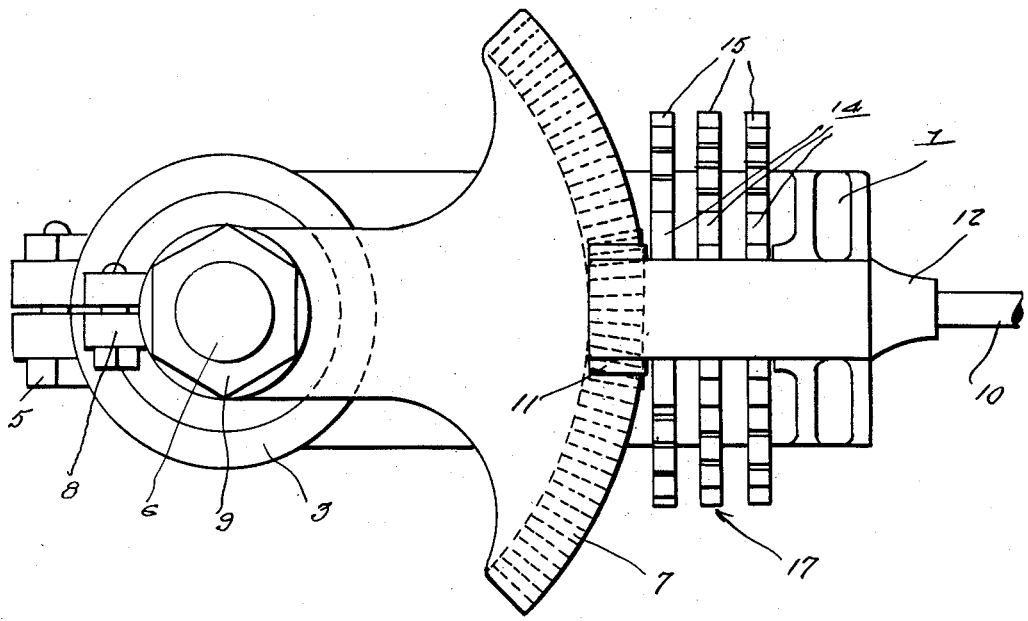
Figure 2 is a view in top plan thereof.

Referring now to the drawings in detail, it will be seen that the embodiment of the invention which has been illustrated comprises an angular frame or bracket 1 in the form of a casting having an integral, split clamp 2 on one end for engagement around the usual vertical tubular standard 3 of a conventional tractor which is designated generally by the reference numeral 4. The split clamp 2 is secured on the upper end portion of the standard 3 through the medium of bolts 5. The reference numeral 6 designates the usual vertical driven shaft of the tractor which projects above the tubular standard 3 in which said shaft is mounted for rotation, a segmental gear 7 being detachably secured on the upper end portion of the shaft, as by an integral clamp 8 and a nut 9.

The driving shaft 10 of the steering mechanism of the tractor 4 has its forward end portion journaled in the upper portion of the frame 1, said upper portion of the frame terminating in a reversed end portion 11 which constitutes a bearing for said shaft 10. The reference numeral 12 designates another bearing in which the shaft 10 is journaled in the frame 1. The usual steering wheel of the tractor 4 on the rear end portion of the shaft 10 is designated by the reference numeral 13.

Figure 5:
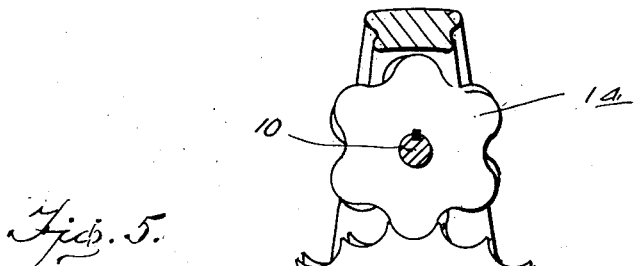
Figure 5 is a view in vertical transverse section, taken substantially on the line 5—5 of Figure 3.

Fixed on the forward end portion of the shaft 10 between the bearings 11 and 12 of the frame 1 is a series of gears 14 the teeth of which are rounded, as illustrated to advantage in Figures 4 and 5 of the drawings. The gears 14 mesh with integral gears 15 which are fixed on a shaft 16 which is journaled in the frame 1 in parallelism with the shaft 10. The teeth of the gears 15 are formed to accommodate the rounded teeth of the gears 14, as best seen in Figure 5 of the drawings. The gears 15, being integral with each other, constitute a unitary structure, or compound gear, which is designated generally by the reference numeral 17. A beveled gear 18 is also fixed on the shaft 16 in the frame 1 and meshes with the segmental gear 7 of the tractor steering mechanism.

The construction of the meshed series of gears 14 and 15 is such that power may be readily transmitted from the shaft 10 to the shaft 16 and thence, through the gears 18 and 7, to the shaft 6 but the transmission of power in the opposite direction will be prevented. This is true for the reason that the rounded teeth of the gears 14 will engage properly between the substantially pointed teeth of the gears 15, as seen in Figure 5 of the drawings, but should power be applied from the opposite direction, the crowns or points of the teeth of the gears 15 will engage the crowns or tops of the teeth of said gears 14 instead of meshing therewith, as suggested in Figure 4 of the drawings, thus locking or binding said gears 14 and 15 against rotation. It will be noted that the gears 15 are considerably larger than the gears 14 for rendering steering of the tractor easy. It will also be noted that the teeth of the series of gears 14 and 15 are not aligned, thus assuring a substantially continuous drive or movement. While three gears 14 and 15 have been shown, any desired number, for example, two or four, may be provided.

It is believed that the many advantages of a steering apparatus in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. The combination with a steering mechanism including a drive shaft and a driven shaft, of an angular frame, an integral split clamp on one end of the frame for mounting said frame on a support, the frame further including a substantially reversed free end portion, the drive shaft being journaled in said reversed free end portion and in the opposed portion of the frame, another shaft journaled in the frame in parallelism with the drive shaft, gears fixed on the drive shaft, gears fixed on the third named shaft and engaged with the first named gears for actuation thereby, and means operatively connecting the driven shaft to the third named shaft for actuation thereby.

2. The combination with a steering mechanism including a drive shaft and a driven shaft, of an angular frame, an integral split clamp on one end of the frame for mounting said frame on a support, the frame further including a substantially reversed free end portion, the drive shaft being journaled in said reversed free end portion and in the opposed portion of the frame, another shaft journaled in the frame in parallelism with the drive shaft, gears fixed on the drive shaft, gears fixed on the third named shaft and engaged with the first named gears for actuation thereby, and means operatively connecting the driven shaft to the third named shaft for actuation thereby, said means including a gear fixed on the drive shaft, and a gear fixed on the third named shaft and engaged with the drive shaft gear.

3. The combination with a vehicle steering mechanism including a drive shaft, a vertical tubular standard, a driven shaft rotatably mounted in the standard and a segmental gear fixed on the driven shaft, of an angular frame, a split clamp integral with one end of the frame for mounting said frame on the standard, said frame further including a substantially reversed free end portion constituting a bearing, the drive shaft being journaled in the frame and in said free end portion, another shaft journaled in the frame in parallelism with the drive shaft, gears operatively connecting the third named shaft to the drive shaft for actuation thereby, and a gear fixed on the third named shaft and engaged with the first named gear.

ORRIN RUSSEL HELLER.